US012384966B2

(12) United States Patent
Fan (10) Patent No.: US 12,384,966 B2
(45) Date of Patent: *Aug. 12, 2025

(54) SYNTHESIS OF ORDERED NANOROD ARRAYS

(71) Applicant: National Technology & Engineering Solutions of Sandia, LLC, Albuquerque, NM (US)

(72) Inventor: Hongyou Fan, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 403 days.

This patent is subject to a terminal disclaimer.

(21) Appl. No.: 17/579,239

(22) Filed: Jan. 19, 2022

(65) Prior Publication Data

US 2023/0227721 A1 Jul. 20, 2023

(51) Int. Cl.
| | | |
|---|---|---|
| *C09K 11/00* | (2006.01) | |
| *C01G 49/08* | (2006.01) | |
| *C09K 11/02* | (2006.01) | |
| *C09K 11/88* | (2006.01) | |
| *B22F 1/054* | (2022.01) | |
| *B22F 9/16* | (2006.01) | |
| *B82Y 20/00* | (2011.01) | |
| *B82Y 25/00* | (2011.01) | |
| *B82Y 40/00* | (2011.01) | |

(52) U.S. Cl.
CPC ............ *C09K 11/883* (2013.01); *C01G 49/08* (2013.01); *C09K 11/025* (2013.01); *B22F 1/054* (2022.01); *B22F 9/16* (2013.01); *B22F 2301/255* (2013.01); *B82Y 20/00* (2013.01); *B82Y 25/00* (2013.01); *B82Y 40/00* (2013.01); *C01P 2004/16* (2013.01); *C01P 2006/42* (2013.01)

(58) Field of Classification Search
None
See application file for complete search history.

(56) References Cited

U.S. PATENT DOCUMENTS

| | | | | |
|---|---|---|---|---|
| 10,121,952 | B2 * | 11/2018 | Talapin | ................... C30B 29/60 |
| 10,947,116 | B2 | 3/2021 | Fan et al. | |
| 2011/0250122 | A1 * | 10/2011 | Joo | ........................... C07C 5/03 |
| | | | | 977/773 |
| 2014/0319563 | A1 * | 10/2014 | Cao | .......................... G02B 5/30 |
| | | | | 252/585 |

(Continued)

FOREIGN PATENT DOCUMENTS

EP 3260414 A1 * 12/2017 ............. B05D 1/202

OTHER PUBLICATIONS

NanoComposix [Dodecanethiol Nanoparticles <https://nanocomposix.com/collections/surface-dodecanethiol>]. (Year: 2024).*

(Continued)

*Primary Examiner* — Mandy C Louie
(74) *Attorney, Agent, or Firm* — Kevin W. Bieg (57) ABSTRACT

A bi-phased approach between good solvents (or non-polar) and bad solvents (polar) can be used to assemble nanorods into highly ordered monolayers or multilayers of ordered nanorod arrays. These ordered nanorod arrays can display unique optical properties. For example, ordered arrays of CdSe/CdS core/shell nanorods were assembled that display polarized photoluminescence.

12 Claims, 6 Drawing Sheets

(56) References Cited

U.S. PATENT DOCUMENTS

2020/0223694 A1* 7/2020 Fan .................. C01B 19/007

OTHER PUBLICATIONS

Jana, N. R. et al., "Liquid Crystalline Assemblies of Ordered Gold Nanorods," Journal of Materials Chemistry, 2002, vol. 12, pp. 2909-2912.
Carbone, L. et al., "Synthesis and Micrometer-Scale Assembly of Colloidal CdSe/CdS Nanorods Prepared by a Seeded Growth Approach," Nano Letters, 2007, vol. 7, pp. 2942-2950.
Jana, N.R. et al., "Wet Chemical Synthesis of High Aspect Ratio Cylindrical Gold Nanorods," Journal of Physical Chemistry B, 2001, vol. 105, pp. 4065-4067.
Chen, M. et al., "Synthesis and Self-Assembly of fcc Phase FePt Nanorods," Journal of American Chemical Society, 2007, vol. 129, pp. 6348-6349.
Chen, O. et al., "Compact High-Quality CdSe/CdS Core/Shell Nanocrystals with Narrow Emission Linewidths and Suppressed Blinking," Nature Materials, 2013, vol. 12, pp. 445-451.

* cited by examiner

SYNTHESIS OF ORDERED NANOROD ARRAYS

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to nanoparticles and, in particular, to the synthesis of ordered nanorod arrays.

BACKGROUND OF THE INVENTION

Nanorods are unique functional materials. See W. Wei et al., *Angew. Chem. Int. Ed.* 131, 12082 (2019). Different from nanoparticle with spherical morphology, nanorods are one-dimensional and have anisotropic morphology that often show unique properties. The ability to assemble nanorods into ordered arrays to exhibit anisotropic function is crucial for their nano-electronic and optical applications. Current approaches are essentially limited to aqueous processes using hydrophilic nanorods. See N. R. Jana et al., *J. Mater. Chem.* 12, 2909 (2002). These aqueous processes rely on evaporation induced drying or assembly at liquid-vapor interface, which leads to ill-defined morphology of the ordered arrays. Additionally, drying stress often crack the final arrays.

SUMMARY OF THE INVENTION

The present invention is directed to a method to synthesize ordered nanorod arrays, comprising providing a colloidal suspension of nanorods having a hydrophobic surface in a non-polar solvent, and counter-diffusing the non-polar solvent and a polar anti-solvent into each other, thereby slowly precipitating ordered nanorod arrays from the colloidal suspension. The counter-diffusing can comprise adding the polar anti-solvent on top of the colloidal suspension and allowing the non-polar solvent to counter-diffuse into each other. The nanorods can have an aspect ratio equal to or greater than about 3 (i.e., +/−10%) and can be assembled into ordered nanorod arrays comprising one or more hexagonal monolayers.

BRIEF DESCRIPTION OF THE DRAWINGS

The detailed description will refer to the following drawings, wherein like elements are referred to by like numbers.

FIGS. 2A-2D are transmission electron microscope (TEM) images of CdSe/CdS core/shell nanoparticles and nanorods.

FIGS. 3A-3D are scanning electron microscope (SEM) images of the self-assembled superstructures of CdSe/CdS core/shell nanoparticles and nanorods.

FIGS. 6A-6D show photoluminescence (PL) polarization of LNR thin films of two different configurations, flakes and reference. FIG. 6A is a schematic illustration of the PL measurement. The emission intensity of two orthogonal polarization directions vertical (v) and horizontal (h) to the substrate.

DETAILED DESCRIPTION OF THE INVENTION

The present invention is directed to the synthesis of highly ordered arrays (e.g., flakes, monolayers, superdisks, etc.) of nanorods that display unique optical properties. This invention uses a bi-phased approach between good solvents (or non-polar) and bad solvents (polar) to assemble nanorods into highly ordered monolayers or multilayers of ordered nanorod arrays. A related bi-phased approached has been used to assemble isotropic spherical nanoparticle arrays, but has not been used to assemble one-dimensional nanomaterials. See U.S. Pat. No. 10,947,116 to H. Fan and K. Bian. Through guidance of theoretical calculation, this invention allows the controlled synthesis of ordered arrays.

The method to synthesize ordered nanorod arrays comprises providing a colloidal suspension of nanorods having a hydrophobic surface in a non-polar solvent, and counter-diffusing the non-polar solvent and a polar anti-solvent into each other, thereby forming a solvent/anti-solvent mixture and slowly precipitating the nanorods into an ordered nanorod array. The ordered nanorod arrays can comprise semiconductor, metal, or magnetic nanorods, such as semiconducting CdS, CdSe, ZnS, and ZnSe, metallic gold and silver, and magnetic $Fe_3O_4$ and FePt. See L. Carbone et al., *Nano Lett.* 7(10), 2942 (2007); N. R. Jana et al., *J. Phys. Chem. B* 105, 4065 (2001); and M. Chen et al., *J. Am. Chem. Soc.* 129(20), 6348 (2007). The nanorods can further comprise rigid hydrophobic organic macromolecules such as porphyrins and phthalocyanine. For example, the hydrophobic surface can comprise an alkyl, such as alkyl thiol, alkyl amine, alkyl acid, or alkyl phosphine. For example, the non-polar solvent can comprise toluene, hexane, benzene, or xylene. For example, the polar anti-solvent can comprise isopropanol, ethanol, methanol, or tetrahydrofuran. The size and quality of the ordered nanorod arrays depend on the initial nanorod concentration of diffusion speed. The ordered nanorod arrays can be greater than one hundred microns in lateral dimension.

Synthesis of CdSe Seeds

As an example of the invention, CdSe/CdS nanorods (NRs) were synthesized using a seeded method according to Carbone. See L. Carbone et al., *Nano Lett.* 7(10), 2942 (2007). To make the CdSe nanoparticles seeds, 240 mg CdO, 1.26 g octadecylphosphonic acid (ODPA) and 12 g trioctylphosphine oxide (TOPO) were added in a 100 mL three-neck flask. The mixture was melted and heated to 150° C. under vacuum for 1 hour while being stirred to degas the mixture. The resulting CdO suspension was heated to 310° C. under argon gas to form a clear solution into which 6 mL trioctylphosphine (TOP) was injected. The solution was then heated to 370° C. and 1.7 mL of TOP:Se (1.7 M) complex was quickly injected. The solution immediately became orange/red in color indicating formation of CdSe nanoparticles. After reaction for 1 minute, the heat mantel was removed and the flask was cooled down in air. The raw product was separated and cleaned by three cycles of precipitation with acetone and toluene. The purified nanoparticles were dissolved in TOP to form a stock CdSe seed solution. The stock solution was characterized to contain 2.9 nm CdSe nanoparticles with a concentration of 0.4 mM.

Synthesis of CdSe/CdS Core/Shell Nanorods

To synthesize the CdSe/CdS core/shell nanorods, in a 50 mL three-neck flask, 0.086 g CdO as Cd precursor was mixed with 3 g TOPO, 0.29 g ODPA and 80 mg hexaphosphoric acid (HPA) and heated to 150° C. under vacuum for one hour to degas the mixture and then to 350° C. under Ar to form a clear Cd precursor solution. Meanwhile, in an Ar glove box, a sulfur precursor solution was prepared by dissolving 0.12 g sulfur powder in 2 mL TOP at 110° C. then mixing the sulfur precursor solution with 0.2 mL CdSe seed solution. The seeded sulfur precursor solution was then quickly injected into the Cd precursor solution. The reaction proceeded for 6 min before the heating mantel was removed to allow the reactor to cool down in air. The raw product was separated and cleaned by three cycles of precipitation with acetone and toluene. The purified CdSe/CdS core/shell nanorods having a hydrophobic trioctylphosphine surface were redispersed in toluene. Nanorods of different sizes were achieved by changing Cd and S precursor concentrations correspondingly.

Synthesis of Spherical CdSe/CdS Core/Shell Nanoparticles

Spherical CdSe/CdS core/shell nanoparticles were synthesized using method reported by Chen. See O. Chen et al., *Nat. Mater.* 12(5), 445 (2013). Briefly, in a 100 mL flask, 0.5 mL CdSe seed solution was added into 6 mL octadecene (ODE) and 6 mL oleylamine. The mixture was degassed at 120° C. for 1 hr then heated to 310° C. under Ar. Using a syringe pump, 6 mL of ODE solution of octanethiol (0.13M) and cadmium oleate (0.13M) were slowly (6 mL/hr) injected simultaneously into the seed solution as S and Cd precursors, respectively. Then 2 mL oleic acid was injected to further stabilize the nanoparticles before cooling the reactor in air. The raw product was separated and cleaned by three cycles of precipitation with acetone and toluene. The purified CdSe/CdS core/shell nanoparticles having a hydrophobic oleylamine surface were redispersed in toluene.

Growth of Ordered Nanorod Arrays and Thin Film Deposition

Figure 1:
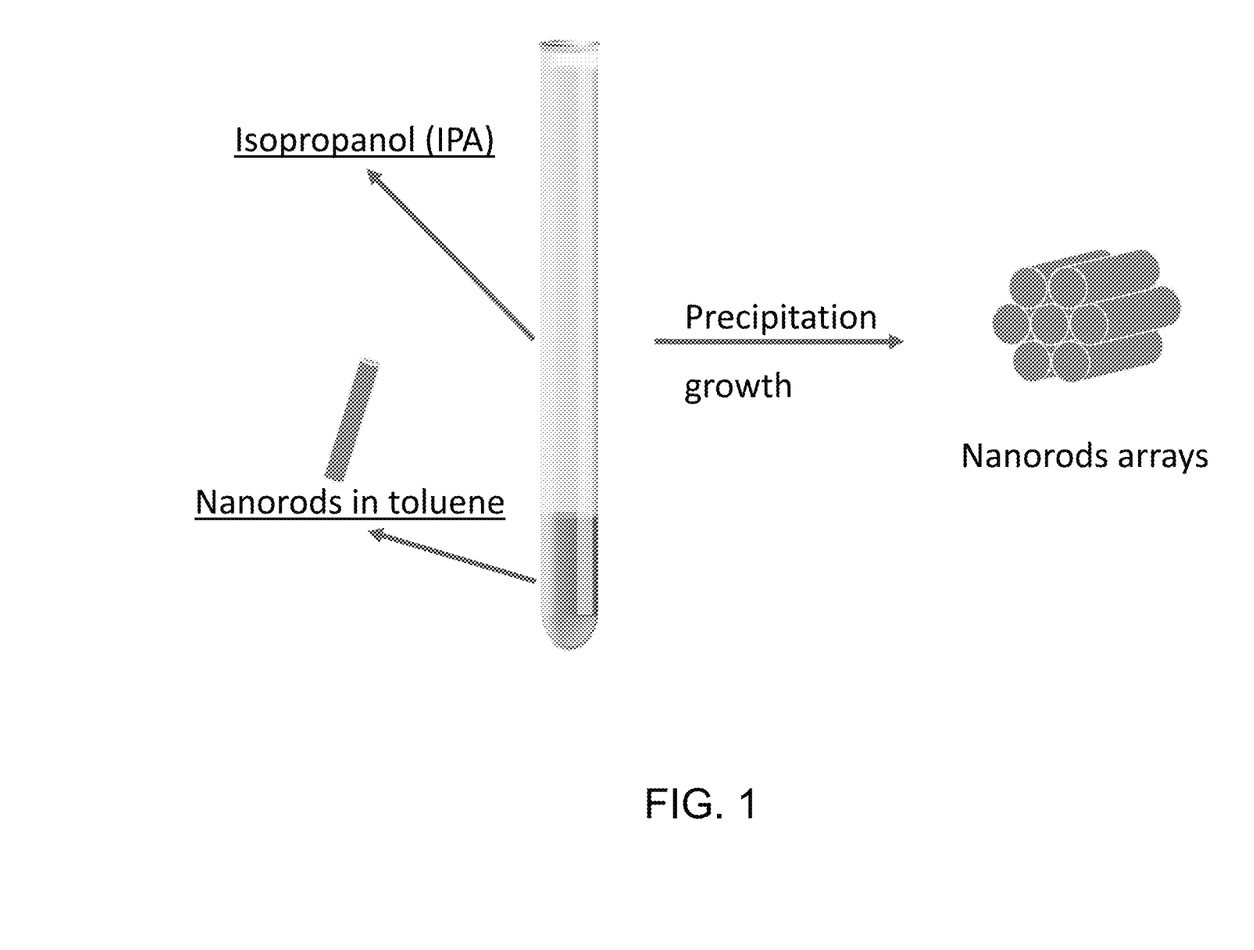
FIG. 1 is a schematic illustration of the synthesis of an ordered nanorod array.
Figure 2A:
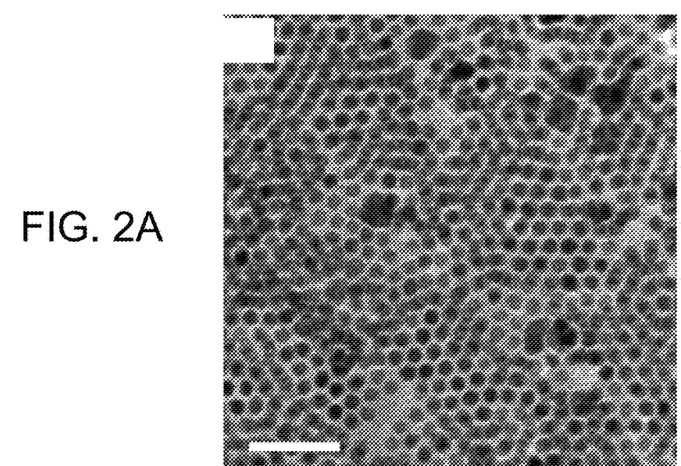
FIG. 2A is a TEM image of spherical nanoparticles (SpNP).
Figure 2B:
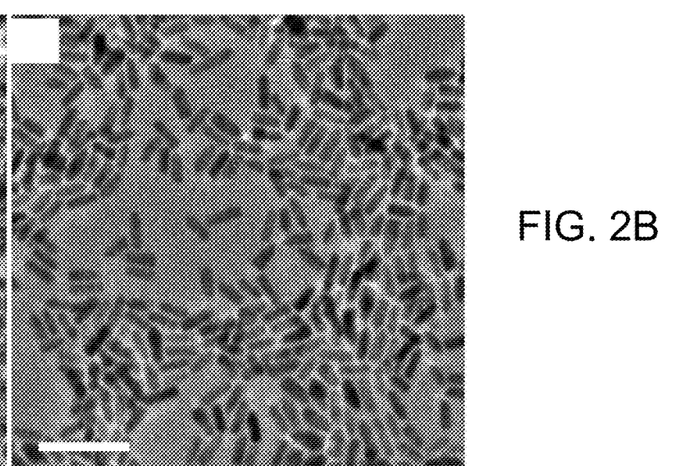
FIG. 2B is a TEM image of short nanorods (SNR).
Figure 2C:
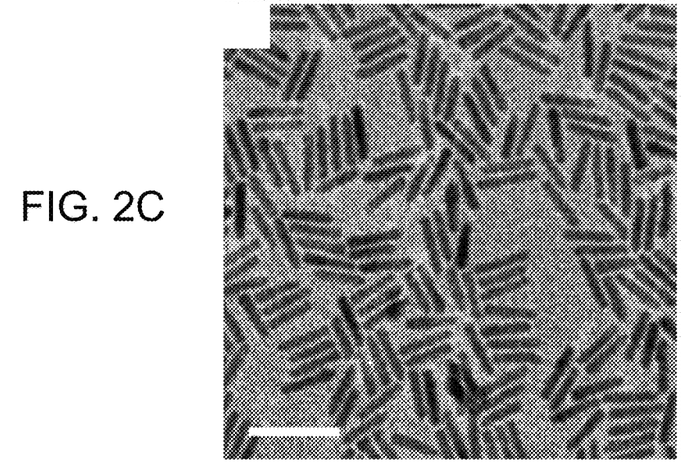
FIG. 2C is a TEM image of medium nanorods (MNR).
Figure 2D:
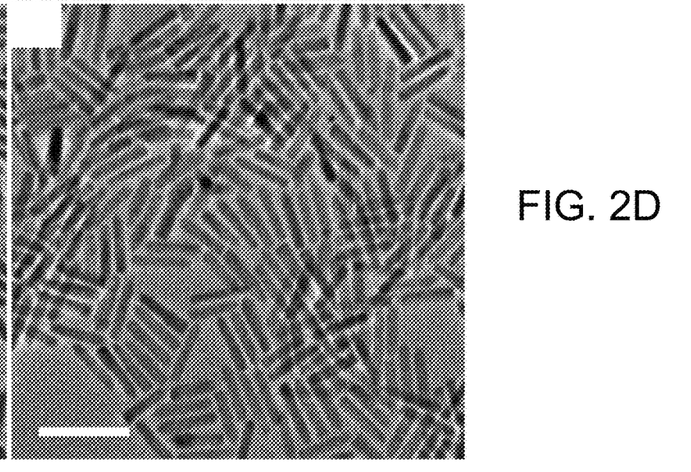
FIG. 2D is a TEM image of long nanorods (LNR). Scale bars are 50 μm.

The ordered nanotube arrays were grown by a counter-diffusion method that has previously been used to grow supercrystals from nanoparticles. See U.S. Pat. No. 10,947, 116 to H. Fan and K. Bian, which is incorporated herein by reference. As shown in FIG. 1, a vertically positioned test tube was filled with solutions of the synthesized nanorods or nanoparticles suspended in the non-polar solvent toluene. The anti-solvent isopropanol (IPA) was then carefully added on top of the toluene suspension with a volumetric ratio of IPA:toluene=4:1. A liquid-liquid interface between the two solvents was formed. The total height of the liquid was about 6 cm. The tubes was left undisturbed as the counter-diffusion of the two solvents into each other proceeded, as indicated by a blurred interface. As the anti-solvent IPA concentration increased in the toluene solvent phase, the nanorods or nanoparticles became over saturated and slowly precipitated. The growth was considered complete when the interface disappeared and the mixture became homogenous and colorless. The product ordered nanorod arrays or nanoparticle supercrystals were collected by removing the liquid, rinsed, and then stored in ethanol. To deposit a monolayer film of the ordered nanorod arrays on a substrate, their solutions were added dropwise on the surface of water in a Petri dish until a continuous film was formed. Then a substrate, either glass or Si wafer, was placed on the water surface and withdrawn to pick up the ordered array film, which was then dried and characterized.

Four different sizes of nanoparticles/nanorods were synthesized, as shown in in FIGS. 2A-2D and Table 1. The average particle size was determined by statistics from multiple TEM images.

TABLE 1

List of CdSe/CdS core/shell nanorods and nanoparticles.

| Sample | Designation | Diameter d (nm) | Length/ (nm) | Aspect Ratio k = l/d |
|---|---|---|---|---|
| Spherical nanoparticle | SpNP | 6.8 nm ± 8.8% | N/A | 1.0 |
| Short nanorod | SNR | 5.4 nm ± 8.5% | 16.1 nm ± 7.8% | 3.0 |
| Medium nanorod | MNR | 5.2 nm ± 8.7% | 27.3 nm ± 6.7% | 5.3 |
| Long nanorod | LNR | 6.1 nm ± 8.5% | 33.7 nm ± 6.8% | 5.5 |

Figure 3A:
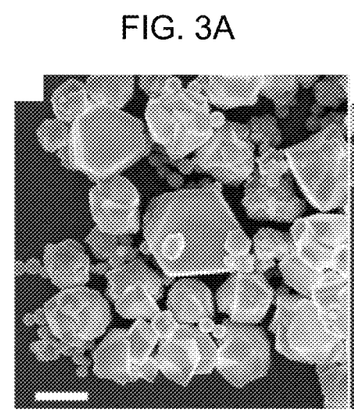
FIG. 3A is an SEM image of 3D supercrystals of SpNP.
Figure 3B:
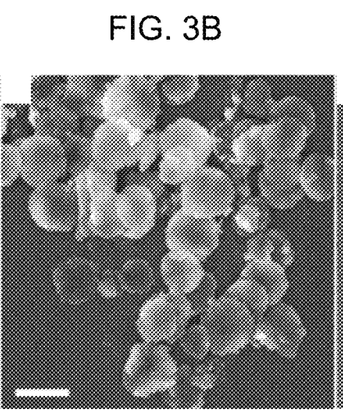
FIG. 3B is an SEM image of multilayered flakes of SNR.
Figure 3C:
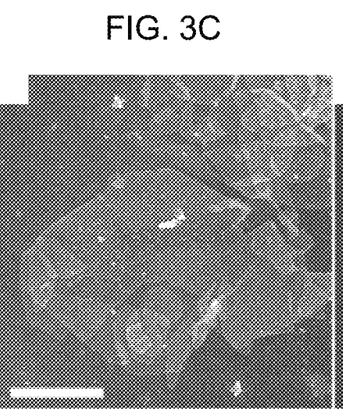
FIG. 3C is an SEM image of a 2D monolayer of MNR.
Figure 3D:
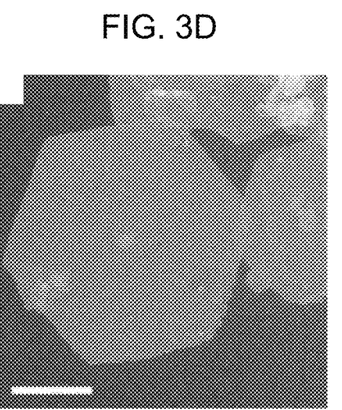
FIG. 3D is an SEM image of a monolayer of LNR. Scales bars are 50 μm.
Figure 3E:
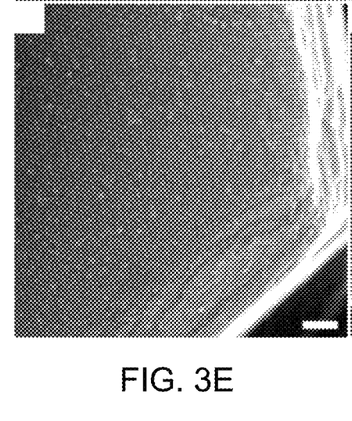
FIGS. 3E-3H are corresponding high resolution images of edges of the superstructures above showing hexagonal packing of the constituent particles. Scale bars are 50 nm.
Figure 3F:
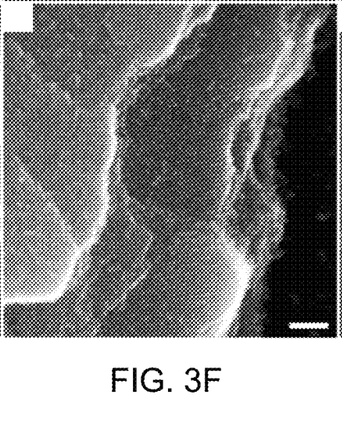
Figure 3G:
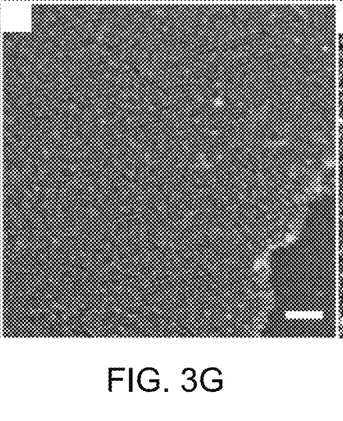
Figure 3H:
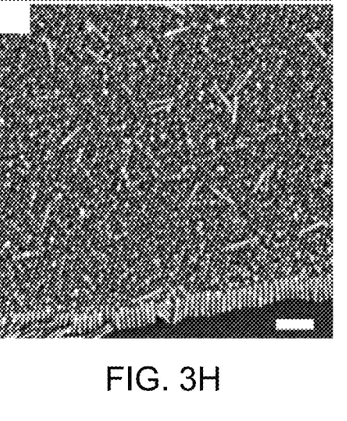
Figure 4:
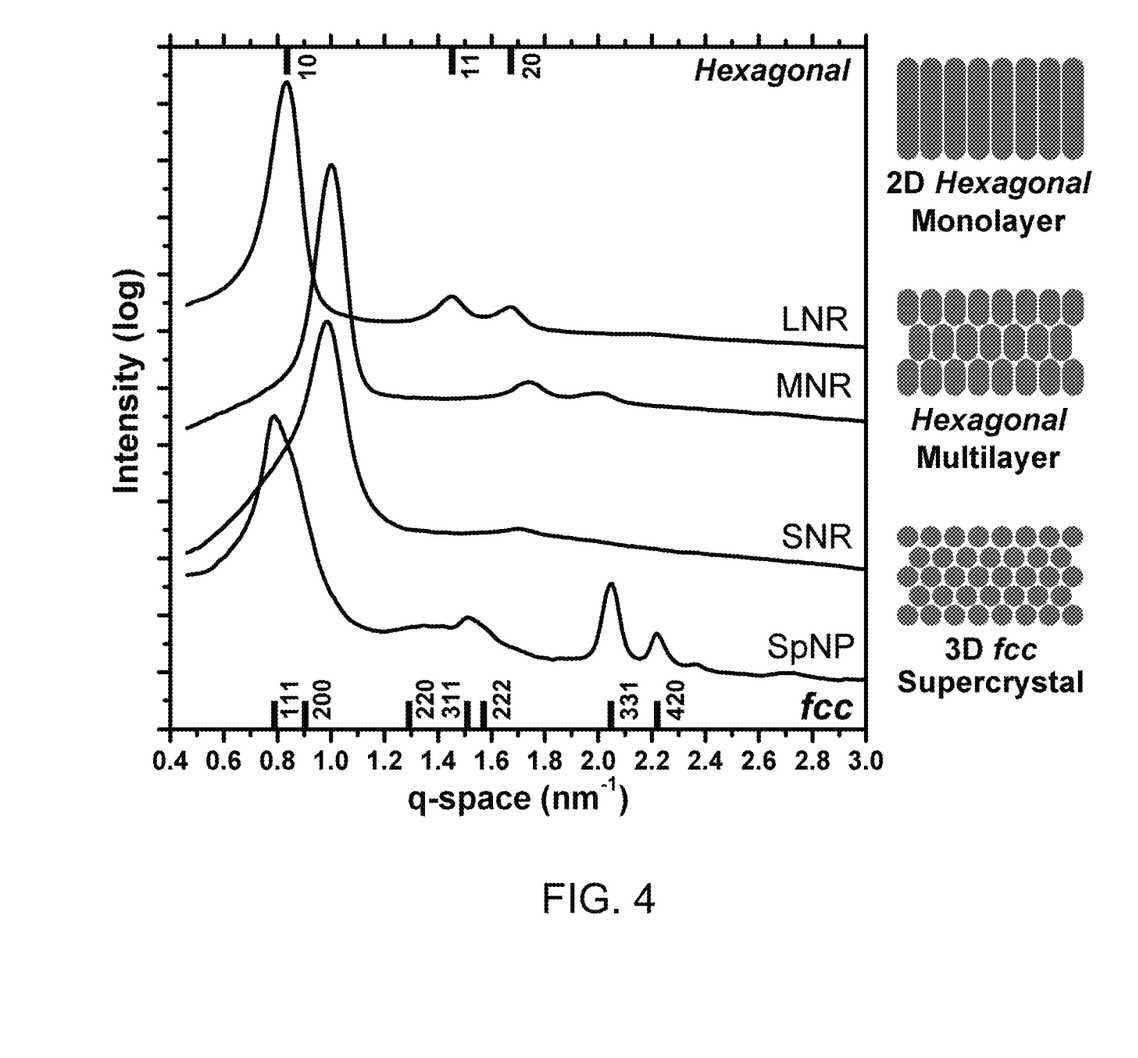
FIG. 4 is a graph of small-angle X-ray scattering (SAXS) patterns of the self-assembled superstructures of CdSe/CdS core/shell nanoparticles and nanorods of different aspect ratios. The Miller indices of the 3D fcc superlattice of SpNP and the 2D hexagonal monolayer superlattice of the LNR samples are labeled at the bottom and top respectively. The inset schematics illustrate the three different morphologies.

The nanoparticles self-assembled into a faceted 3D supercrystal, as shown in the SEM images in FIGS. 3A and 3E. The nanorods self-assembled into different hexagonal ordered arrays, including monolayer and multilayer flakes depending on aspect ratio, as shown in FIGS. 3B-3D and 3F-3H. As shown in FIG. 4, SAXS patterns revealed the superlattice structures. The structure parameters summarized in Table 2. For SpNP, face-center cubic (fcc) supercrystals were formed. Due to the spherical interactions, no orientational order was expected. For SNR, hexagonal multilayered flakes as a transition state were formed with poor ordering. Orientational order was not well established due to the low aspect ratio of the short nanorods. For MNR, hexagonal monolayers were formed with all the nanorods standing up vertically to the monolayer plane. For LNR, hexagonal monolayers were formed with all the nanorods standing up vertically to the monolayer plane.

TABLE 2

Structure parameters of the superlattices

| Sample | Superlattice | Lattice Parameters | Nearest Neighbor distance $d_{NN}$ (nm) | Separation $d_{NN} - d$ (nm) |
|---|---|---|---|---|
| SpNP | fcc supercrystal | a = b = c = 13.8 nm<br>$\alpha = \beta = \gamma = 90°$ | 9.7 | 2.9 |
| SNR | Hex. Multilayer | N/A | 6.3 | 0.9 |
| MNR | Hex. Monolayer | a = b = 6.3 nm<br>$\alpha = 120°$ | 6.3 | 1.1 |
| LNR | Hex. Monolayer | a = b = 7.5 nm<br>$\alpha = 120°$ | 7.5 | 1.4 |

A model to predict superstructure morphology was developed to correlate with the aspect ratio, assuming a self-assembled flake made of piled circular monolayers of nanorods. Nanorods were characterized as cylinders with flat head and bottoms.

The tip surface area is $$A_{tip} = \pi d^2/4 \quad (1)$$

where d is the diameter of an individual nanorod. The side surface area is $$A_{side} = \pi d l \quad (2)$$

where l is the length of an individual nanorod. The number of nanorods in one monolayer is $$N/m \quad (3)$$

where N is the total number of nanorods in a self-assembled flake and m is the number of hexagonal monolayers in a flake, i.e., m≥1. Therefore, the total surface energy of exposed tips in a flake (side+bottom, ×2) is:

$$E_{tip} \times 2 \times \frac{N}{m} \times \frac{\pi d^2}{4} = \frac{E_{tip} N \pi d^2}{2m} \quad (4)$$

The radius R of a monolayer is $$R = \sqrt{\frac{N A_{tip}}{0.907 \pi m}} = 0.525 d \sqrt{\frac{N}{m}} \quad (5)$$

where 0.907 is packing density of a 2D hexagonal lattice. The number of nanorods expose on the side in a monolayer:

$$2\pi R/d \quad (6)$$

The total surface energy of exposed tips in a flake (each nanorod exposes half of its side area, assuming R>>r)

$$E_{side} \times \frac{2\pi R}{d} \times \frac{1}{2} \times A_{side} = 0.525 k E_{side} \pi^2 d^2 \sqrt{\frac{N}{m}} \quad (7)$$

where $E_{side}$ is the surface energy of side and $E_{tip}$ is the surface energy of a tip, and k is the aspect ratio for the nanorod. The total surface energy of the flake, assuming $E_{side} \cong E_{tip} = E_{surf}$ for simplicity, is:

$$E_{total} = \frac{\pi}{2} d^2 E_{surf} \left( \frac{N}{m} + 1.05 \pi k \sqrt{mN} \right) \quad (8)$$

The optimized structure should have $m_{opt}$ that gives lowest $E_{total}$:

$$\frac{\partial E_{total}}{\partial m} = \frac{\pi}{2} d^2 E_{surf} \left( 0.525 k \pi \sqrt{\frac{N}{m}} - \frac{N}{m^2} \right) = 0 \quad (9)$$

$$m_{opt} = 0.72 \sqrt[3]{\frac{N}{k^2}} \quad (10)$$

Now, consider the following special cases:
1. Thin disk, k=0, $$E_{total} = \frac{\pi}{2} d^2 E_{surf} \frac{N}{m},$$

m=N gives minimum energy—coins piled in one column
2. "Sphere", k=1, $$m_{opt} = 0.72 \sqrt[3]{N},$$

3D supercrystal with growth in all three dimensions
3. Needles, k=∞, $E_{total} = 0.525 \pi^2 d^2 E_{surf} k \sqrt{mN}$, m=1 gives minimum energy for monolayer flakes.
4. Short nanorods (k<0.61√N) will lead to a $$m_{opt} = 0.72 \sqrt[3]{N} > 1,$$

i.e. multilayers.
5. Long nanorods (k>0.61√N) will lead to a $m_{opt}$=1, i.e. monolayer.

According to Table 2, nanorods have greater interdigitation (3 nm vs ~1 nm) on the sides compared with spherical nanoparticles which resemble the tips of the nanorods. Therefore, a higher energy is expected at the tips of the nanorods than at the side. $E_{tip} > E_{side}$. This can shift the conclusion of the model quantitatively but not qualitatively. It increases the tendency toward the monolayer configuration. This can explain the difference between model results and experimentally observed results. Ignoring the curvature of the tips of the nanorods also leads to deviations.

This simplified model assumes the self-assembled structures can always find the globally low energy configuration. This is not the case in the actual assembly process. Once a nanorod is attached to a flake by oversaturation-driven precipitation, it becomes immobile. Therefore, it cannot "feel" the entire flake but only the nearby neighbors. This is why simply plugging in the experimental numbers of nanorods in a flake into the model predicts a $m_{opt}$ much higher than the actual results. However, the size of initial nuclei of these flakes is expected to comparable with N, the total number of nanorods in the flake. So, based on the observed configurations for different aspect ratios k summarized in Table 1, it can be estimated that $(k_{SNR}/0.61)^2 < N < (k_{MNR}/0.61)^2 \rightarrow 24 < N < 75$. That is to say, a nanorod can only "feel" a few tens of its neighbors.

Figure 5A:
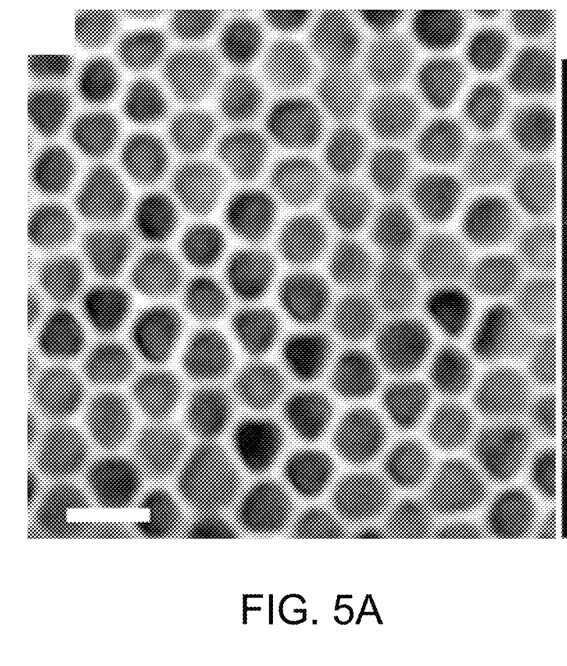
FIG. 5A is a TEM image showing vertically aligned NRs in the monolayer of LNRs shown in FIGS. 3D and 3H. Scale bar is 10 nm.
Figure 5B:
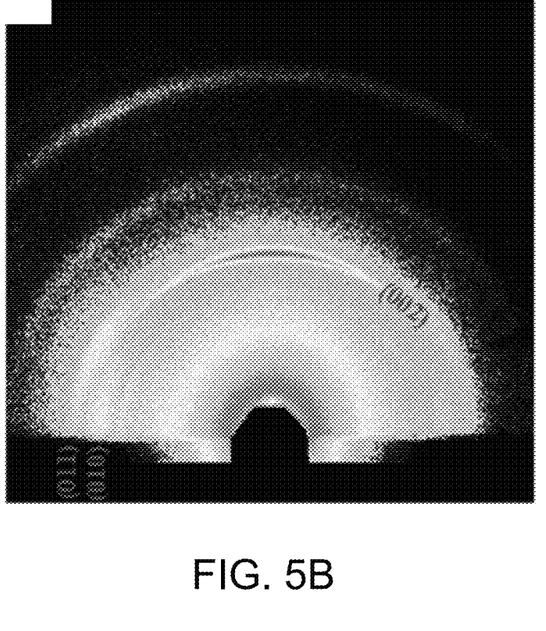
FIG. 5B is a wide-angle X-ray scattering (WAXS) pattern showing a strong (002) peak confirming the uniform vertical alignment of the nanorods on the substrate.
Figure 5C:
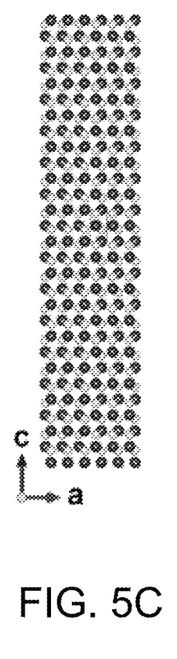
FIG. 5C is a schematic of an individual nanorod showing the wurtzite crystal structure, the (002) planes of this nanorod are parallel with the underlying substrate, corresponding to the WAXS pattern.

The structure of a monolayer sample of a long nanorod is shown in FIG. 5. The TEM in FIG. 5A shows the nanorods in the "stand up" configuration in a monolayer. This was confirmed by WAXS in FIG. 5B.

Figure 6A:
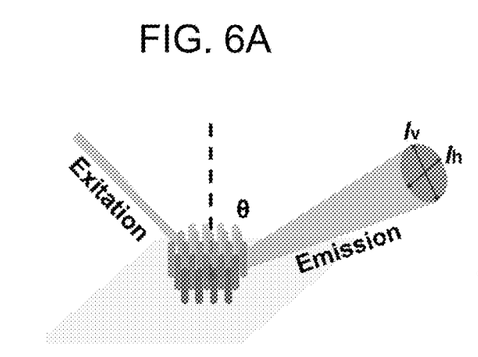

Polarized photoluminescence measurements were performed by a custom-built optical system, as shown in FIG. 6A. A 532 nm laser was focused to excite the sample on a glass slide. The incident angle was 15° to avoid specular reflection being detected. The emitted light was converged by an objective lens into an optic fiber which guided the emission to an optical spectrometer. Before the objective lens, the emission light passed a polarizer set either parallel or perpendicular to the sample film. The emission spectra were collected at reflection angles θ of 10° 20° . . . 80°. A bare glass slide was used as reference. The emission intensity was calculated by integrating the area under the luminescence peak.

Figure 6B:
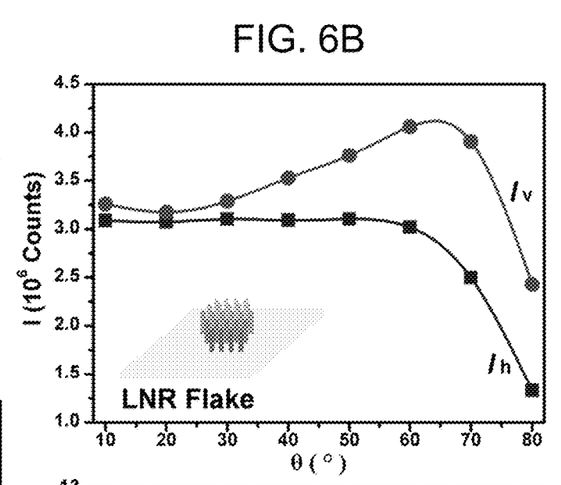
FIGS. 6B and 6C are graphs of the integrated PL emission intensity at varying detection angle θ of the hexagonal monolayer flake and reference sample, respectively. The insets demonstrate the configuration of nanorods on glass substrates in each sample. The drop of intensity above θ=60° is caused by partial lens blockage by the substrate.
Figure 6C:
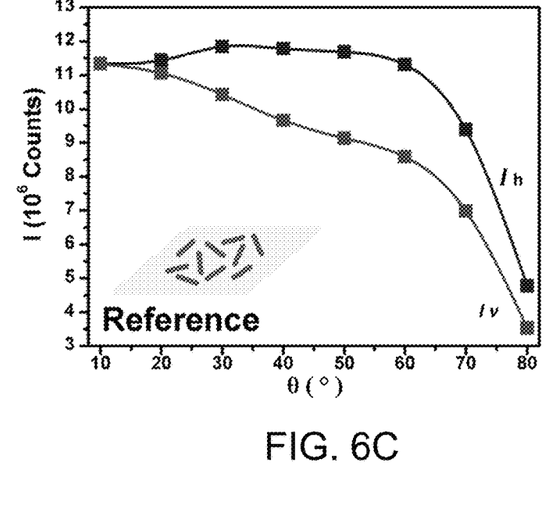
Figure 6D:
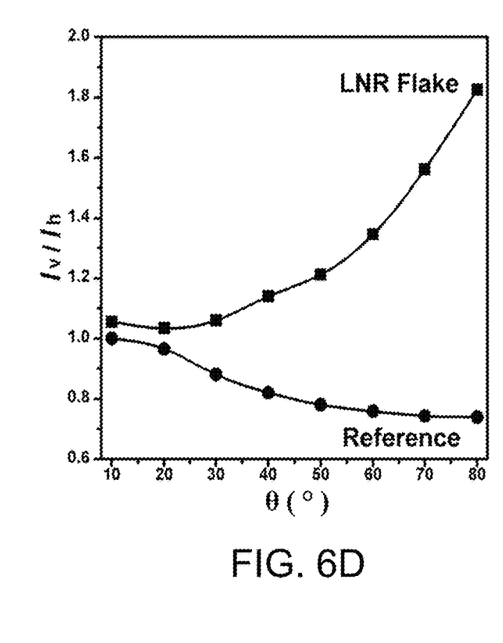
FIG. 6D is a graph of intensity ratio between vertical and horizontal polarization for the two configurations. Strong vertically polarized emission was observed from LNR flakes due to the "standing up" configuration of nanorods.

Optical experiments on the self-assembled long nanorod monolayer flakes (superstructure, ordered) drop cast on a glass slide from an ethanol suspension were compared with the reference sample (random, disordered) formed by a long nanorod solution in toluene drop cast on a glass slide. Photoluminescence polarization measurements, shown in FIG. 6B, indicate preferential vertically polarized emission of the flake sample deposited on the glass slide. As shown in FIG. 6C, the reference sample with nanorods lying on the substrate with random orientation showed slight horizontal polarity at grazing angle. The drop of intensity above θ=60° is caused by partial lens blockage by the substrate. Comparing with reference sample, the emission from the monolayer flakes displayed high polarity vertical to the substrate, as shown in FIG. 6D. This is a direct consequence of the vertically aligned nanorods in the flake.

The present invention has been described as synthesis of ordered nanorod arrays. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A method to synthesize ordered nanorod arrays, comprising:
    providing a colloidal suspension of nanorods having a hydrophobic organic surface in a non-polar solvent, and
    counter-diffusing the non-polar solvent and a polar anti-solvent into each other to form a solvent/anti-solvent mixture, thereby slowly precipitating the nanorods having the hydrophobic organic surface from the colloidal suspension to form ordered nanorod arrays.

2. The method of claim 1, wherein the counter-diffusing comprises adding the polar anti-solvent on top of the colloidal suspension and allowing the non-polar solvent and the polar anti-solvent to counter-diffuse into each other.

3. The method of claim 1, wherein the nanorods have an aspect ratio equal to or greater than about 3.

4. The method of claim 1, wherein the ordered nanorod arrays comprise one or more hexagonal monolayers.

5. The method of claim 1, wherein the ordered nanorod arrays comprise semiconductor, metal, or magnetic nanorods.

6. The method of claim 5, wherein the semiconductor nanorods comprise CdS, CdSe, ZnS, ZnSe, or combinations thereof.

7. The method of claim 6, wherein the semiconductor nanorods comprise CdSe/CdS core/shell nanorods.

8. The method of claim 5, wherein the metal nanorods comprise gold or silver.

9. The method of claim 5, wherein the magnetic nanorods comprise $Fe_3O_4$ or FePt.

10. The method of claim 1, wherein the hydrophobic organic surface comprises an alkyl thiol, alkyl amine, alkyl acid, or alkyl phosphine.

11. The method of claim 1, wherein the non-polar solvent comprises toluene, hexane, benzene, or xylene.

12. The method of claim 1, wherein the polar solvent comprises isopropanol, ethanol, methanol, or tetrahydrofuran.

* * * * *